US007746826B2

(12) United States Patent
Ma et al.

(10) Patent No.: US 7,746,826 B2
(45) Date of Patent: Jun. 29, 2010

(54) METHOD FOR WIRELESS TERMINAL DYNAMICALLY SWITCHING WINDOW IN A WIRELESS LAN ENVIRONMENT

(75) Inventors: Fengguo Ma, Shenzen (CN); Bo Sun, Shenzen (CN); Yin Gao, Shenzen (CN); Feng Li, Shenzen (CN); Shaohua Wu, Shenzen (CN)

(73) Assignee: ZTE Corporation (CN)

( * ) Notice: Subject to any disclaimer, the term of this patent is extended or adjusted under 35 U.S.C. 154(b) by 554 days.

(21) Appl. No.: 11/722,451

(22) PCT Filed: Dec. 21, 2004

(86) PCT No.: PCT/CN2004/001483

§ 371 (c)(1),
(2), (4) Date: Jun. 21, 2007

(87) PCT Pub. No.: WO2006/066447

PCT Pub. Date: Jun. 29, 2006

(65) Prior Publication Data

US 2010/0020769 A1    Jan. 28, 2010

(51) Int. Cl.
*H04W 36/30* (2009.01)
(52) U.S. Cl. .................................. 370/332; 455/436
(58) Field of Classification Search ................ 370/331, 370/332, 338; 455/436–440, 426.2
See application file for complete search history.

(56) References Cited

U.S. PATENT DOCUMENTS 7,164,915 B2 * 1/2007 Zaki ............................ 455/436

2005/0030924 A1 * 2/2005 Yano et al. .................. 370/332

FOREIGN PATENT DOCUMENTS

| CN | 1330502 A | 1/2002 |
| CN | 1438789 A | 8/2003 |
| CN | 1330502 A | 1/2004 |
| CN | 1503589 A | 6/2004 |
| CN | 1568043 A | 1/2005 |
| GB | 2313740 A | 12/1997 |

* cited by examiner

*Primary Examiner*—CongVan Tran
(74) *Attorney, Agent, or Firm*—Sutherland Asbill & Brennan LLP

(57) ABSTRACT

The invention discloses a method for wireless terminal dynamically switching window in a wireless LAN environment. The wireless LAN comprises several access points and stations which establish wireless communication connections with the access points. The stations can switch the current access window by scanning. The method characterizes in that including following steps: giving the switching window an initial value through the stations; the stations judge if there is another access point of which the signal quality is greater than that of the current access window through scanning wireless channels; if so, further judge if the stations are in a frequently handoff status, if so, the handoff judging result is not allowed to switch window; if not, the handoff judging result is allowed to switch window. The present invention can adaptively adjust the stations' switch windows according to the stations' handoff status and frequently handoff status. On one hand, the invention avoids the occurring of frequently handoff by changing the handoff conditions of the stations, increasing the access efficiency of the stations which is in the handoff status and in a wireless LAN environment, while maintaining the sensitivity of the stations which is in the handoff status, ensuring the quality of the wireless links between the stations and the access points.

18 Claims, 2 Drawing Sheets

METHOD FOR WIRELESS TERMINAL DYNAMICALLY SWITCHING WINDOW IN A WIRELESS LAN ENVIRONMENT

RELATED APPLICATIONS

This is a submission pursuant to 35 U.S.C. 154(d)(4) to enter the national stage under 35 U.S.C. 371 for PCT/CN2004/001483, filed Dec. 21, 2004.

TECHNICAL FIELD

The present invention relates to a wireless local area network (LAN) system in communication field, especially relates to adaptively adjusting the switch windows before a wireless terminal occurs frequent handoff, so as to avoid the continuous occurring of frequent handoff, and meanwhile to ensuring the wireless signal quality between the station and the access points within an acceptable range.

BACKGROUND ART

A wireless local area network, such as a wireless LAN conforming to IEEE802.11a/b/g, refers to interconnecting computer devices by using wireless communication techniques, and constructing a network system capable of intercommunication and resource sharing.

In a wireless LAN environment, a typical network topology structure is called an extended service set. As shown in FIG. 1, an extended service set system consists of one or more basic service sets and a distributed system for connecting these basic service sets. Each basic service set includes a wireless access point device. The extended service set is distinguished by an extended service set identifier, and the wireless access point is distinguished by a basic service set identifier, i.e. an access point identifier. By scanning channels, the station obtains the information of the extended service sets and the basic service sets in the wireless LAN environment where the station locates, and chooses and joins a suitable basic service set.

When a station needs to be joined into a wireless LAN, the normal communication can only be started by connecting with the access point. The station at a certain time can only establish connection with one access point. If the station needs to change certain attributes of the connection while keeping the current connection, it may start another connection process.

After the station establishes connection with one access point, it checks whether there is an access point with better signal quality through scanning the channels, if such an access point exists, the station will establish connection with the new access point through a re-connecting process and cut off the connection with the old access point. This process is called handoff.

The current wireless LAN protocols do not prescribe the conditions for a station to perform handoff. Usually, it is realized by using the method of switching windows, i.e., when the station finds that the signal quality of a new access point is greater than that of the old access point by a predetermined handoff window value, the handoff will be performed. However, the violent variation of the wireless environment and unsuitably set handoff window value will lead to frequent handoff of the station between two access points with similar signal quality.

SUMMARY OF THE INVENTION

To solve the problem above, the invention presents a method for adaptively adjusting the switch windows according to the handoff status before the station occurs frequent handoff so as to avoid continuous occurring of frequent handoff. In the method, the size of the switch window can be configured adaptively according to the handoff frequency, so as to reduce the probability of frequent handoff at the station, and improve the access efficiency of station handoff in the wireless LAN environment on the basis of ensuring the wireless signal quality between the station and the access point within an acceptable range.

The invention discloses a method for wireless terminal dynamically switching window in a wireless LAN environment. The wireless LAN includes several access points and a station which establishes connections with the access points by the way of wireless communication. The station can switch the current access window by scanning. The method is characterized in including the following steps: giving the switch window an initial value by the station; the station deciding whether there is another access point whose signal quality is greater than that of the current access window by searching wireless channels; if there existing such an access point whose signal quality is greater than that of the current access window, further deciding whether the station is in a frequent handoff status, if so, the handoff judging result is not allowed to switch window; if not, the handoff judging result is allowed to switch window.

The method of the invention also includes setting a switch window timer with a predetermined period in the station, and starting the timer at the same time when the station gives the switch window an initial value.

In the invention, the step of giving the switch window an initial value by the station also involves storing a fixed maximum handoff threshold and a fixed minimum handoff threshold respectively in each station; storing a fixed first and a fixed second switch window adjustment units (D1, D2) respectively in each station.

The method of the invention also involves storing a fixed third switch window adjustment unit (D3) in each station.

According to the method of the invention, if the waiting time reaches the predetermined period of the switch window timer, the station will subtract a third switch window adjustment unit (D3) from the current switch window, and reassign the result as the adjusted value of the current window.

The method of the invention also includes comparing the adjusted value of the current window with the minimum handoff threshold, if the value of the current switch window is greater than the minimum handoff threshold, still being in the waiting status of the timer.

The method of the invention includes comparing the adjusted value of the current window with the minimum handoff threshold, if the value of the current switch window is not greater than the minimum handoff threshold, setting the current switch window as the minimum handoff threshold by the station.

In the method of the invention, if the handoff judging result is not allowed to switch the window, the station will add a first switch window adjustment unit (D1) to the value of the current switch window and reassign the result as the adjusted value of the current window.

In this invention, the step of adding a first switch window adjustment unit (D1) to the value of the current switch window also includes resetting the timer of the window.

In the method of the invention, if the adjusted value of the current window is not less than the maximum handoff threshold, the value of the current switch window will be set as the maximum handoff threshold, and the handoff will be stopped. If the adjusted value of the current window is less than the maximum handoff threshold, the station will stop the handoff.

In the method of the invention, if the handoff judging result is allowed to switch window, the station will add a second switch window adjustment unit (D2) to the value of the current switch window, and reassign the result as the adjusted value of the current window.

In the method of the invention, the step of adding a second switch window adjustment unit (D2) to the value of the current switch window also includes resetting the timer of this window.

In the method of the invention, if the adjusted value of the switch window is not less than the maximum handoff threshold, the current switch window will be set as the maximum handoff threshold by the station, and the handoff will be stopped. If the adjusted value of the switch window is less than the maximum handoff threshold, the station will stop the handoff.

In the method of the invention, the initial value is not greater than the maximum handoff threshold, and is not less than the minimum handoff threshold.

In the method of the invention, the maximum handoff threshold is not less than the minimum handoff threshold.

In the method of the invention, the first switch window adjustment unit (D1) is not greater than the difference between the maximum handoff threshold and the minimum handoff threshold.

In the method of the invention, the third switch window adjustment unit (D3) is not less than 0, and is not greater than the second switch window adjustment unit (D2).

In the method of the invention, the first switch window adjustment unit (D1) is not less than the second switch window adjustment unit (D2), and the second switch window adjustment unit (D2) is not less than the third switch window adjustment unit (D3).

The present invention can adaptively adjust the switch windows of the station according to the station's handoff status and frequently handoff status. The invention avoids the occurring of frequent handoff by changing the handoff conditions of the station, thereby increasing the access efficiency of the station which is in the handoff status and in a wireless LAN environment. Meanwhile, the adaptive adjustment of switch window maintains the sensitivity of the station which is in the handoff status, and ensures the signal quality of the wireless links between the station and the access points.

PREFERRED EMBODIMENT OF THE INVENTION

Figure 1:
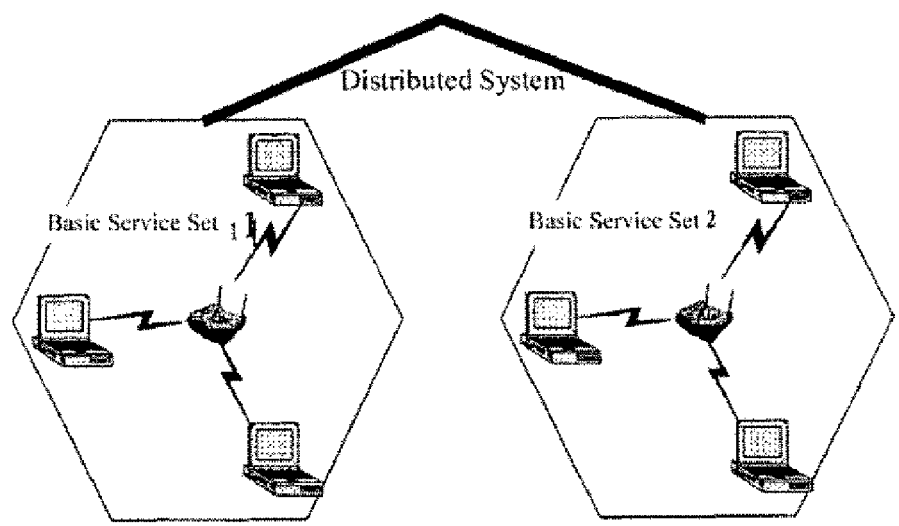
FIG. 1 is a schematic view of the extended service set in a wireless LAN.

According to the technical scheme of the invention, the steps for initializing handoff parameters include: initializing the handoff window and initializing the switch window timer.

Firstly, a station STA stores a fixed maximum handoff threshold and a fixed minimum handoff threshold, while satisfying that the maximum handoff threshold is not less than the minimum handoff threshold.

The station STA also stores a fixed switch window adjustment unit D1, a fixed switch window adjustment unit D2, and a fixed switch window adjustment unit D3, while satisfying that D1 is not less than D2, D2 is not less than D3, D3 is not less than 0, and D1 is not larger than the difference between the maximum handoff threshold and the minimum handoff threshold.

The station STA gives an initial value to the switch window when initializing, said initial value is not greater than the maximum handoff threshold, and is not less than the minimum handoff threshold.

Secondly, the station STA maintains a switch window timer, which has a fixed timing period. When the timing period expires, the timer will be restarted to realize circular timing. The station STA starts the above timer with the above timing period.

The invention especially includes a step for judging whether the handoff is allowed, i.e. judging the handoff conditions and frequent handoff status.

By searching the wireless channels periodically, the station STA checks whether there is another access point AP2 whose signal quality is greater than that of the access point AP1, and satisfying that the difference of signal quality values between the access point AP2 and access point AP1 is not less than the current switch window of the station STA, if such an access point AP2 exists, the handoff conditions are met, and turn to step 2, otherwise, continue to search.

STA decides whether itself is in frequent handoff state, if yes, the handoff permission judging result is not allowed to switch window; if not, the handoff permission judging result is allowed to switch window.

According to the invention, it also includes in particular an adjustment process for switching the window adaptively. In the process, the switch window is adjusted according to the handoff state, and the station STA adjusts the switch window according to the handoff permission judging result with the following principles: 1) if the handoff permission judging result is not allowed to switch, adding one switch window adjustment unit D1 to the current switch window; 2) if the current switch window after adjustment is greater than the maximum handoff threshold, setting the current switch window as the maximum handoff threshold; 3) if the handoff permission judging result is allowed to switch, adding one switch window adjustment unit D2 to the current switch window; 4) if the current switch window after adjustment is greater than the maximum handoff threshold, setting the current switch window as the maximum handoff threshold.

Additionally, when the switch window is adjusted according to the switch window timer, the station STA maintains one switch window timer, and adjusts the switch window according to the status of the switch window timer with the following principles: 1) keeping circular timing of the switch window timer, i.e. when the switch window timer expires, resetting the switch window timer to restart timing; 2) if any operation of adjusting the switch window occurs, resetting the switch window timer to restart timing; 3) if the switch window timer expires, subtracting one switch window adjustment unit D3 from the switch window; 4) if the current switch window after adjustment is less than the minimum handoff threshold, setting the current switch window as the minimum handoff threshold.

Figure 2:
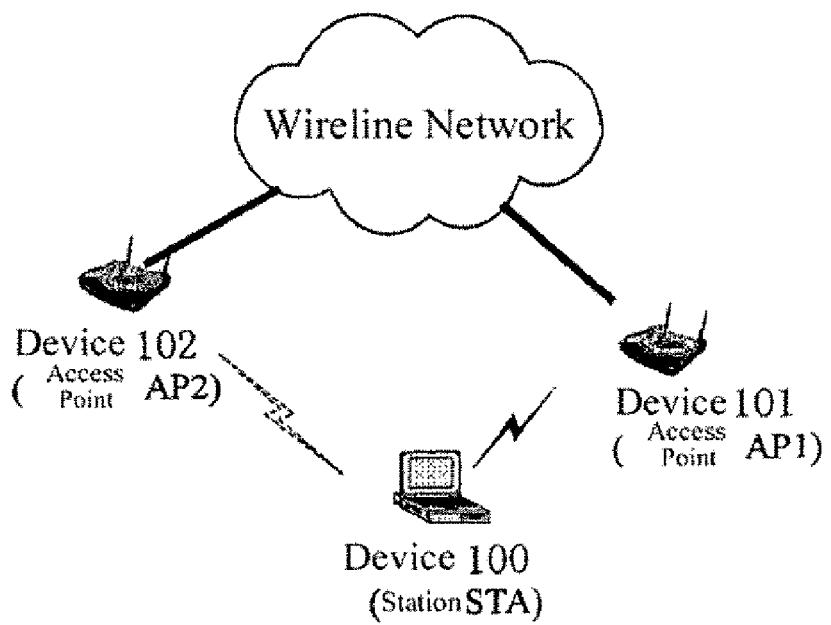
FIG. 2 is a schematic view of an embodiment of the invention.

The method of the invention is applicable to the structure of wireless LAN as illustrated in FIG. 1, with reference to the schematic view of the embodiment as illustrated in FIG. 2. In the wireless LAN environment to which the method of the invention is applied, there are at least two access points AP1 (i.e. device 101) and AP2 (i.e. device 102) that belong to a same extended service set, as well as a station STA (i.e. device 100), wherein the station STA and the access point AP1 have already established connection.

The device 100 is a wireless network interface card device up to the wireless LAN standard IEEE 802.11a/b/g. The devices 101 and 102 are wireless access point devices up to the wireless LAN standard IEEE 802.11a/b/g.

The device 100 detects the existing devices 101 and 102 by scanning channels, and chooses to establish a connection with the device 101.

Figure 3:
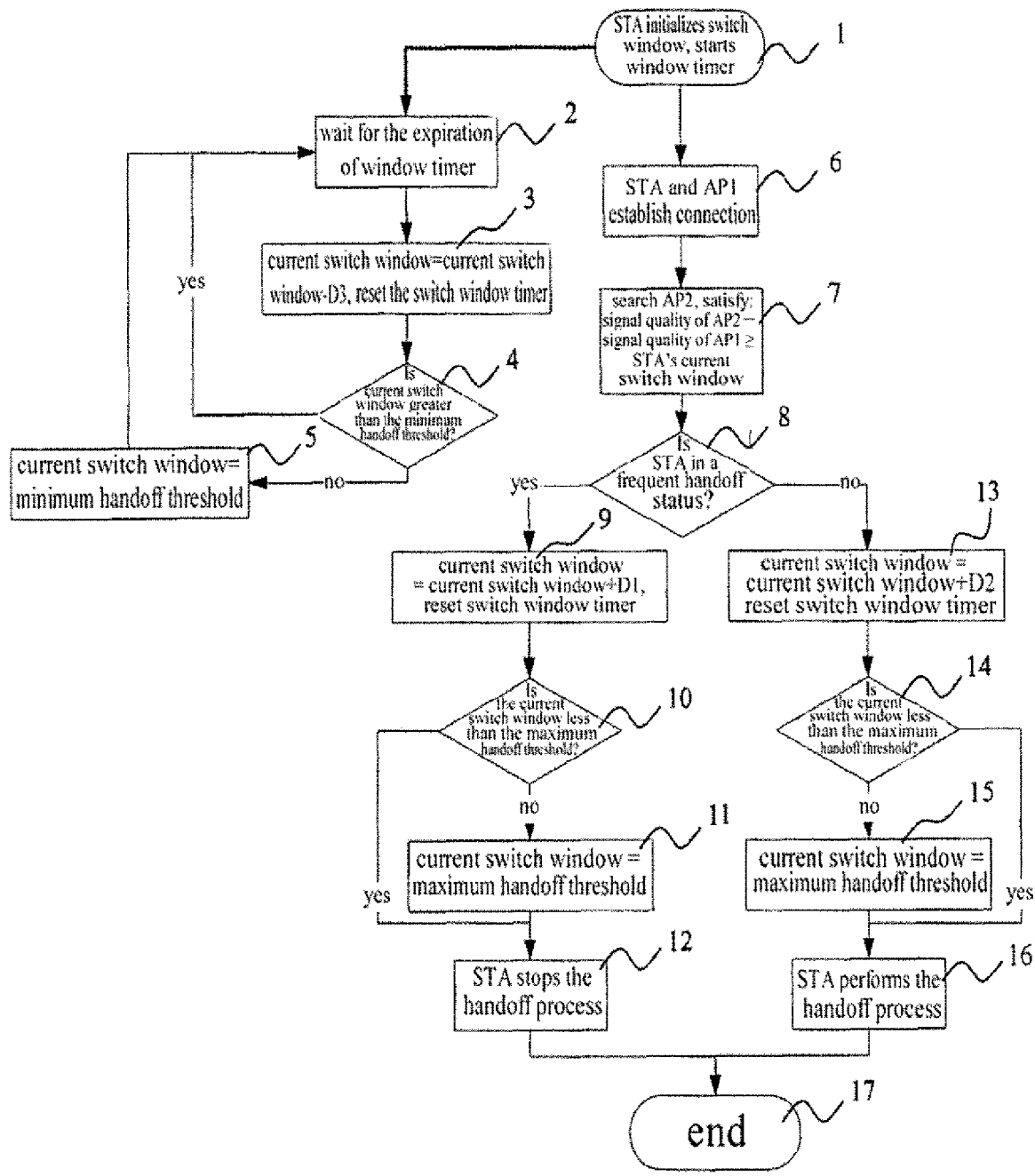
FIG. 3 is a schematic view of performing the window switch of the invention.

One handoff process of the device 100 conforming to the description of the invention is shown in FIG. 3, and is described as follows:

step S01, starting the device 100, initializing the current switch window and the switch window timer, starting the switch window timer, and turning to step S02 and step S06;

step S02, the device 100 waiting for the expiration of the switch window timer and turning to the next step.

step S03, if the switch window timer of the device 100 is expired, subtracting a switch window adjustment unit D3 from the current switch window, resetting the switch window timer, and turning to the next step.

step S04, if the current switch window of the device 100 is not greater than the minimum handoff threshold, turning to step S05; otherwise, turning to step S02.

step S05, setting the current switch window as the minimum handoff threshold by the device 100, turning to step S02.

step S06, establishing connection between the device 100 and device 101, and turning to the next step.

step S07, the device 100 searching for the device 102, said device 102 satisfying that the difference of the signal quality values between the device 102 and the device 101 is greater than the current switch window of device 100, if the device 102 is found, turning to the next step; otherwise, continuing the search.

step S08, if the device 100 is in the frequent handoff status, turning to step S09; otherwise, turning to step S13.

step S09, if the device 100 is in the frequent handoff status, adding a switch window adjustment unit D1 to the current switch window, resetting the switch window timer, and turning to the next step.

step S10, if the current switch window of the device 100 is not less than the maximum handoff threshold, turning to step S11; otherwise, turning to step S12.

step S11, setting the current switch window as the maximum handoff threshold by the device 100, and turning to step 12.

step S12, the device 100 stopping the handoff process, and turning to step 17.

step S13, adding a switch window adjustment unit D2 to the current switch window by the device 100, resetting the switch window timer, and turning to the next step.

step S14, if the current switch window of the device 100 is not less than the maximum handoff threshold, turning to step S15; otherwise, turning to step S16.

step S15, setting the current switch window as the maximum handoff threshold by the device 100, and turning to step 16.

step S16, the device 100 completing the handoff process, and turning to the next step.

step S17, ending the process.

Apparently, for people skilled in the art, considerable modifications and variations can be made according to the technical scheme of the invention. All these modifications and variations should fall within the protection scope of the appended claims of the invention.

What we claim is:

1. A method for wireless terminal dynamically switching window in a wireless LAN environment, wherein said wireless LAN includes several access points and a station which establishes connections with the access points by a way of wireless communication, said station can switch a current access window by scanning, comprising the following steps of:

giving an initial value to a switch window by the station, wherein a switch window timer with a predetermined period is set in the station, and the timer will be started at a same time when the switch window is given the initial value by the station, wherein the step of giving an initial value to the switch window by the station comprises:

storing a fixed maximum handoff threshold and a fixed minimum handoff threshold respectively in the station, and storing a fixed first and a fixed second switch window adjustment units (D1, D2) respectively in each station;

judging whether there is another access point whose signal quality is greater than that of the current access window through searching wireless channels by the station;

wherein if there is such an access point whose signal quality is greater than that of the current access window, then further judging whether the station is in a frequent handoff status, wherein if the station is in the frequent handoff status, then a handoff judging result being not allowed to switch the window, wherein if the station is not in the frequent handoff status, then the handoff judging result being allowed to switch the window.

2. The method of claim 1, wherein if the handoff judging result is not allowed to switch the window, the station will add a first switch window adjustment unit (D1) to the value of the current switch window to obtain an addition result, and reassign the addition result as the adjusted value of the current window.

3. The method of claim 2, wherein the step of adding a first switch window adjustment unit (D1) to the value of the current switch window also includes resetting the switch window timer.

4. The method of claim 3, wherein if the adjusted value of the current window is not less than the maximum handoff threshold, the value of the current switch window will be set as the maximum handoff threshold, and a handoff process will be stopped.

5. The method of claim 3, wherein if the adjusted value of the current window is less than the maximum handoff threshold, the station will stop a handoff process.

6. The method of claim 1, wherein if the handoff judging result is allowed to switch the window, the station will add a second switch window adjustment unit (D2) to the value of the current switch window to obtain an addition result, and reassign the addition result as the adjusted value of the current window.

7. The method of claim 6, wherein the step of adding a second switch window adjustment unit (D2) to the value of the current switch window also includes resetting the switch window timer.

8. The method of claim 6, wherein if the adjusted value of the switch window is not less than the maximum handoff threshold, the station will set the current switch window as the maximum handoff threshold, and stop a handoff process.

9. The method of claim 8, wherein if the adjusted value of the switch window is less than the maximum handoff threshold, the station will stop the handoff process.

10. The method of claim 1, wherein the initial value is not greater than the maximum handoff threshold, and is not less than the minimum handoff threshold.

11. The method of claim 1, wherein the maximum handoff threshold is not less than the minimum handoff threshold.

12. The method of claim 11, wherein the first switch window adjustment unit (D1) is not greater than a difference between the maximum handoff threshold and the minimum handoff threshold.

13. The method of claim 12, wherein a fixed third switch window adjustment unit (D3) is stored in the station, wherein the third switch window adjustment unit (D3) is not less than 0, and is not greater than the second switch window adjustment unit (D2).

14. The method of claim 13, wherein the first switch window adjustment unit (D1) is not less than the second switch window adjustment unit (D2), and the second switch window adjustment unit (D2) is not less than the third switch window adjustment unit (D3).

15. A method for wireless terminal dynamically switching window in a wireless LAN environment, wherein said wireless LAN includes several access points and a station which establishes connections with the access points by a way of wireless communication, said station can switch a current access window by scanning, comprising the following steps of:

giving an initial value to a switch window by the station, wherein a switch window timer with a predetermined period is set in the station, and wherein a fixed third switch window adjustment unit (D3) is stored in the station;

judging whether there is another access point whose signal quality is greater than that of the current access window through searching wireless channels by the station;

wherein if there is such an access point whose signal quality is greater than that of the current access window, then further judging whether the station is in a frequent handoff status, wherein if the station is in the frequent handoff status, then a handoff judging result being not allowed to switch the window, wherein if the station is not in the frequent handoff status, then the handoff judging result being allowed to switch the window.

16. The method of claim 15, wherein if a waiting time reaches the predetermined period of the switch window timer, the station will subtract a third switch window adjustment unit (D3) from the current switch window to obtain a subtraction result, and reassign the subtraction result as an adjusted value of the current window.

17. The method of claim 16, wherein the adjusted value of the current window is compared with the minimum handoff threshold, and wherein if the value of the current switch window is greater than the minimum handoff threshold, then remaining in a waiting status of the switch window timer.

18. The method of claim 16, wherein the adjusted value of the current window is compared with the minimum handoff threshold, and wherein if the value of the current switch window is not greater than the minimum handoff threshold, then setting the current switch window as the minimum handoff threshold by the station.

* * * * *